United States Patent
Elliott

[15] 3,652,882
[45] Mar. 28, 1972

[54] DYNAMO-ELECTRIC MACHINE ROTORS HAVING INTERNALLY COOLED ROTOR WINDINGS

[72] Inventor: Joseph Merelie Elliott, Newcastle-upon-Tyne, England

[73] Assignee: Reyrolle Parsons Limited, Hebburn Co., Durham, England

[22] Filed: Aug. 25, 1970

[21] Appl. No.: 66,697

[52] U.S. Cl. ...................................310/61, 310/65, 310/180
[51] Int. Cl. .................................................H02k 3/22
[58] Field of Search......................310/61, 64, 65, 59, 52, 54, 310/57, 58, 63, 184, 185, 198, 180

[56] References Cited

UNITED STATES PATENTS

| | | | |
|---|---|---|---|
| 2,756,358 | 7/1956 | Johnson | 310/180 |
| 3,469,125 | 9/1969 | Kranz | 310/64 X |
| 3,034,003 | 5/1962 | Seidner | 310/61 |
| 3,261,995 | 7/1966 | Kohn | 310/64 |
| 2,897,382 | 7/1959 | Hamill | 310/64 |
| 3,046,424 | 7/1962 | Tudge | 310/61 |

Primary Examiner—J. D. Miller
Assistant Examiner—B. A. Reynolds
Attorney—Holman & Stern

[57] ABSTRACT

A dynamo-electric machine cylindrical rotor having in its surface, slots housing conductors of an internally cooled rotor winding, the conductors being cooled by direct contact between a coolant and the conductor material, with the winding having its conductors formed in coils with successive turns of each coil occupying the same pair of slots symmetrically disposed, one on each side of a pole face of the rotor, successive coils occupying successive pairs of slots on respective sides of the pole face, each coil being formed of at least two coil portions, each coil portion comprising helical turns which are so arranged and interleaved with one another that, for at least some of the turns of a coil portion, the coil side in one slot is displaced in a radial direction by at least one conductor thickness from the coil side in the other slot.

5 Claims, 13 Drawing Figures

PATENTED MAR 28 1972 3,652,882
SHEET 1 OF 9
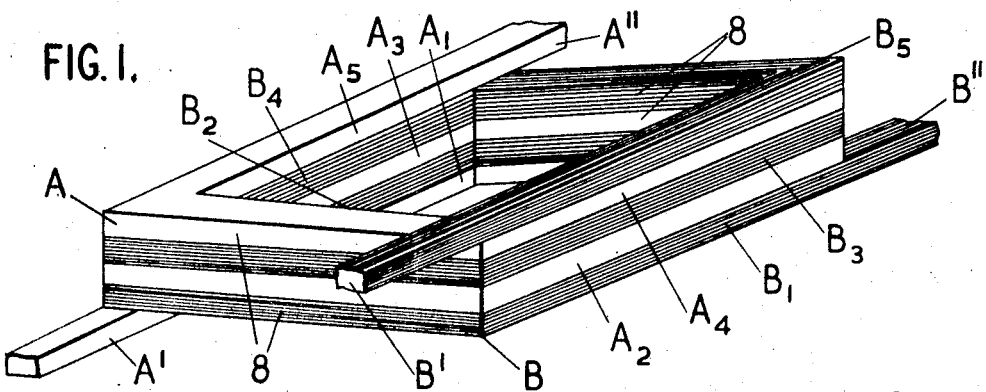
FIG. I.
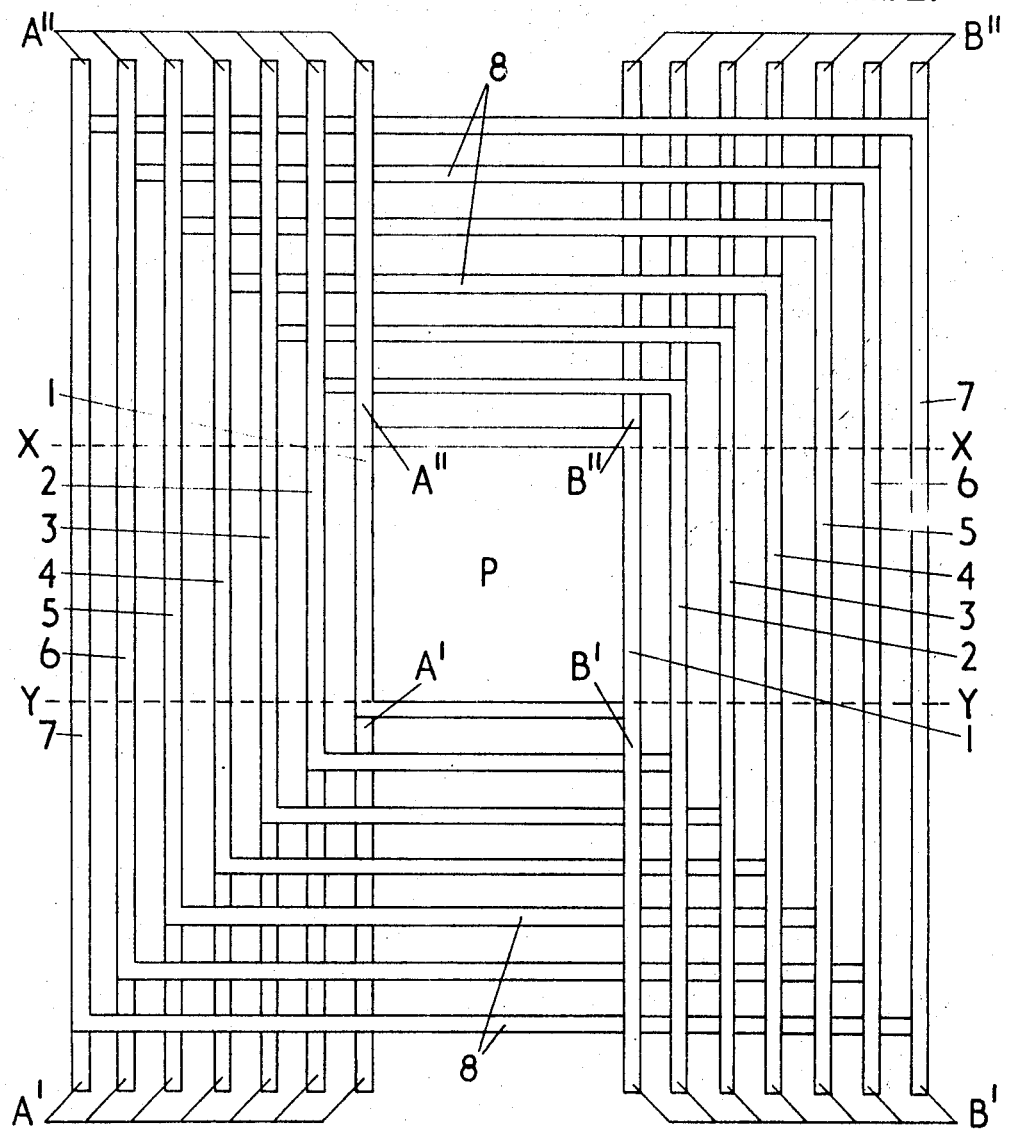
FIG. 2.
INVENTOR
JOSEPH MERELIE ELLIOTT
BY Holman & Stern
ATTORNEYS

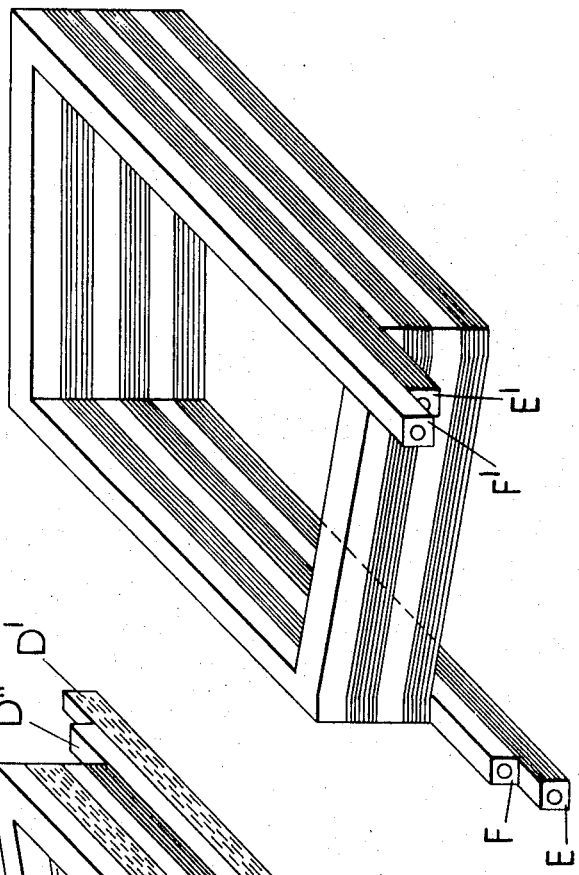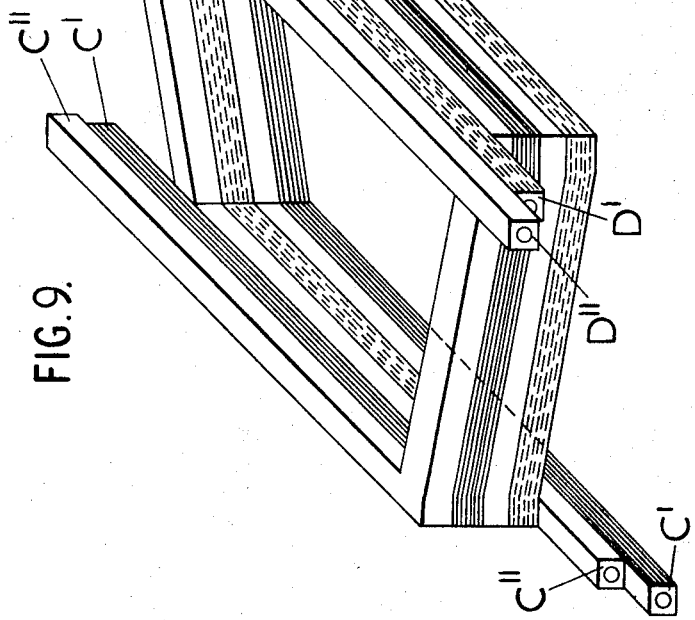

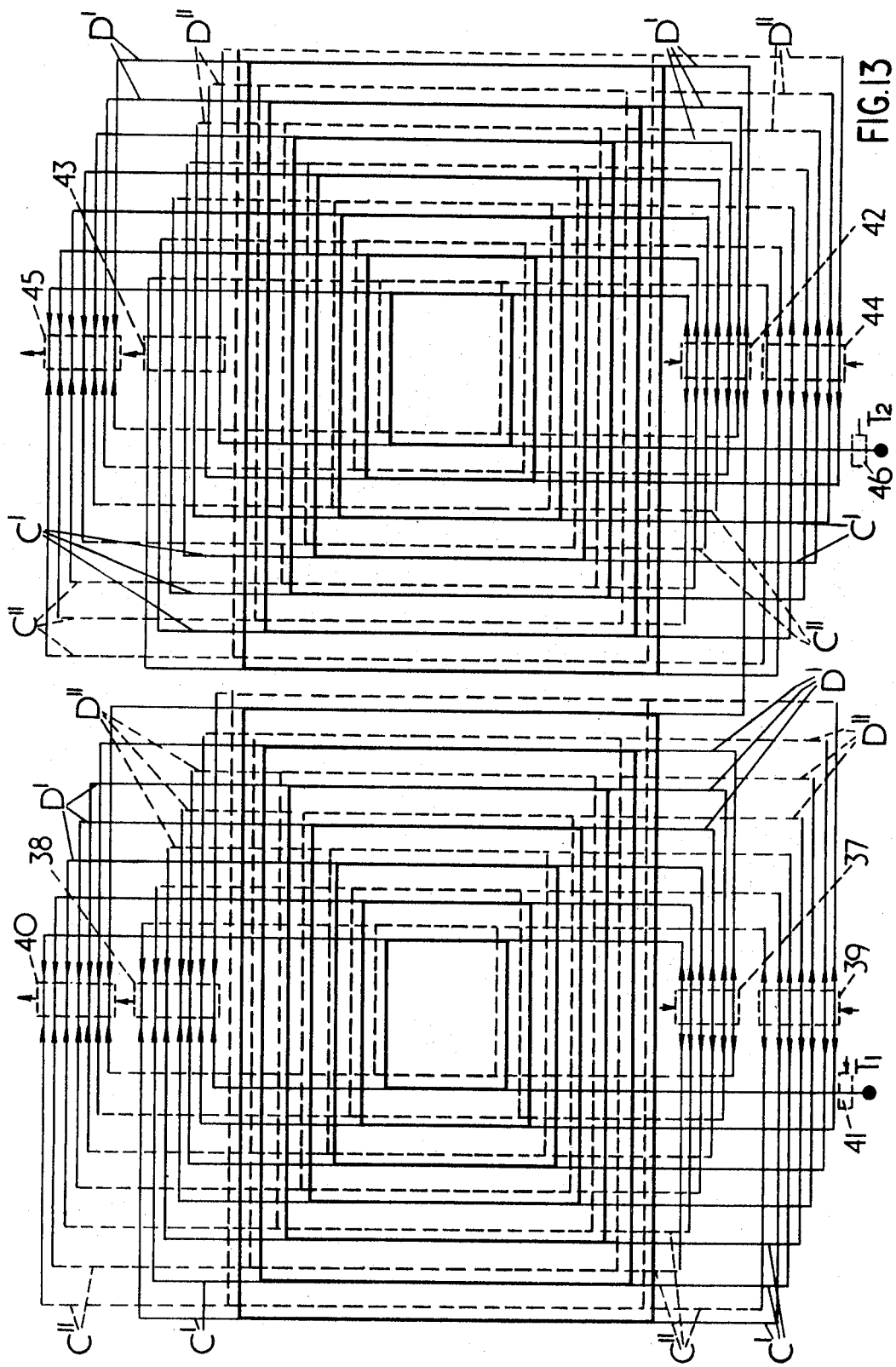

DYNAMO-ELECTRIC MACHINE ROTORS HAVING INTERNALLY COOLED ROTOR WINDINGS

BACKGROUND OF THE INVENTION

This invention relates to dynamo-electric machine rotors having internally cooled rotor windings particularly, though not exclusively, for large turbine driven alternating current generators for power station use.

In large turbo-generators for power station use, it is common practice to cool the rotor conductors by bringing a cooling fluid into direct contact with the material of the conductors. With turbo-generators of say 500 megawatt output and above, the use of a liquid coolant has been proposed to improve the efficiency of heat transfer from the conductor material.

The usual form of winding in a rotor of a turbo-generator is the well-known concentric coil winding, but the arrangement of the coils in the end windings makes it difficult to obtain ready access to the coils for the supply and removal of coolant particularly a liquid or high pressure gas coolant.

The object of the present invention is to provide a modified form of concentric coil winding which facilitates the supply of coolant to the coils forming the winding.

SUMMARY OF THE INVENTION

The invention consists in a dynamo-electric machine cylindrical rotor having in its surface, slots housing conductors of an internally cooled rotor winding, the conductors being cooled by direct contact between a coolant and the conductor material, with said winding having its conductors formed in coils, with successive turns of each coil occupying the same pair of slots symmetrically disposed one on each side of a pole face of the rotor, successive coils occupying successive pairs of slots on respective sides of said pole face, each coil being formed of at least two coil portions each coil portion comprising helical turns which are so arranged and interleaved with one another that, for at least some of the turns of a coil portion, the coil side in one slot is displaced in a radial direction by at least one conductor thickness from the coil side in the other slot.

In one embodiment, two coil portions are interleaved so that coil sides of one portion alternate with coil sides of the other portion, and the number of coil sides in each slot of a pair is chosen so that for each coil portion, the coil ends lie at opposite ends of the rotor, i.e. the coil ends at one end of the rotor are connected to an inlet for coolant and the coil ends at the other end of the rotor are connected to an outlet for coolant. Each coil portion comprises three turns formed by a single conductor or by two or more conductors connected electrically in series but with the passages for coolant flowing in direct contact with conductors being connected in parallel.

In another embodiment, the two coil portions are interleaved in such a way that the inlet and outlet for coolant are at the same end of the rotor.

The rotor winding can be used in two or four pole machines or in machines having more than four poles. It is particularly suitable for water cooled rotors of turbo-generators or synchronous condensers.

The coolant used to cool the coils can also be used to cool electrical connections joining the coil ends to connect in series the coils associated with a given pole.

Embodiments of the invention will now be described with reference to the accompanying drawings in which:

BRIEF DESCRIPTION OF THE DRAWINGS

FIG. 1 shows in a perspective view a rotor coil for a turbo-generator having two coil portions interleaved in accordance with one form of the invention;

FIG. 2 shows a developed view of successive coils constructed in accordance with FIG. 1, associated with a pole face of a rotor;

FIG. 9 and 10 show a coil arrangement in accordance with an alternative form of the invention;

FIGS. 11 and 12 show a coil arrangement in accordance with a further embodiment of the invention.

FIG. 13 is similar to FIG. 10 but the direction of the arrow on item 46 is reversed.

Figure 3:
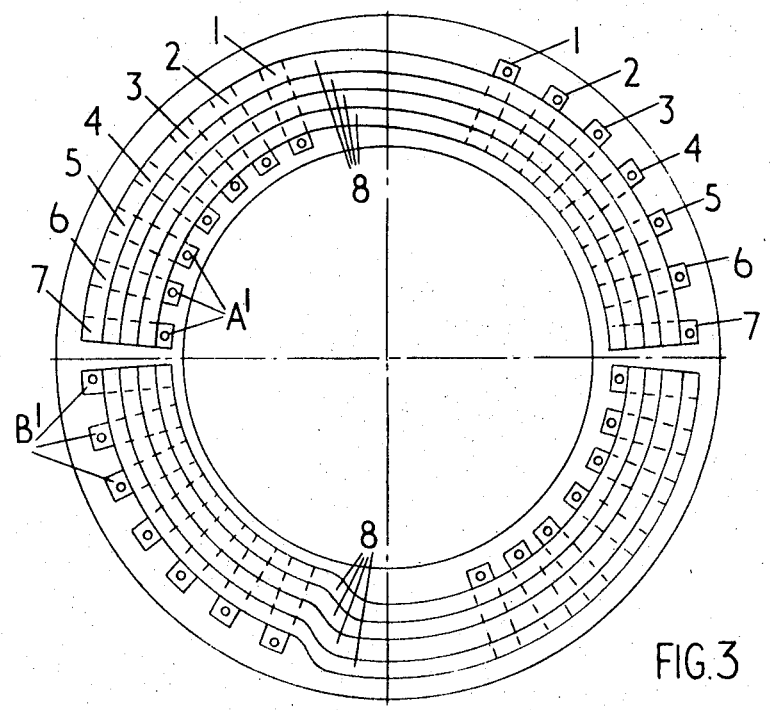
FIG. 3 shows an end view of the coils in a two pole rotor, with electrical connections joining the ends 15 of the coils omitted.

The invention includes a rotor substantially as illustrated in these various figures.

DETAILED DESCRIPTION OF THE EMBODIMENTS

In carrying the invention into effect in the form illustrated by way of example and referring first to FIG. 1 a liquid cooled rotor coil of a turbo-generator comprises two coil portions A and B.

The coil sides of the coil portions which lie in slots in the rotor body are indicated by references $A_1-A_5$ and $B_1-B_5$ respectively. For coil portions A, coil sides $A_1$, $A_3$ and $A_5$ lie in a slot on one side of a pole face of the rotor and coil sides $A_2$ and $A_4$ lie in a slot symmetrically disposed in the opposite side of the pole face.

Coil sides $B_1$, $B_3$ and $B_5$ of the coil portion B are interleaved with the coil sides $A_2$ and $A_4$ and the coil sides $B_2$ and $B_4$ are interleaved with the coil sides $A_1$, $A_3$ and $A_5$.

For coil portion A, coil side $A_2$ is displaced in the radial direction of the slot in which it lies, by one conductor thickness relative to coil side $A_1$. Likewise coil side $A_3$ is displaced radially by one conductor thickness relative to coil side $A_2$ and so on. The same mutual relationship holds for the coil sides of the coil portion B as can be seen from the drawing.

By forming each coil of two coil portions and arranging for the coil sides to be interleaved and displaced in the manner described and illustrated, a space is provided underneath and above the respective coils associated with a given pole face, which permits, for each coil, the coil ends $A'$ and $A''$ of coil portion A and the coil ends $B'$ and $B''$ of coil portion B to pass above or below the assembly of coils to inlet and outlet connections for liquid coolant without the need for cranking or bending the coil ends, as would be necessary with a conventional concentric coil winding.

FIG. shows in a developed view the coils associated with a pole face P of the rotor. The rotor slots for the sake of simplicity have not been shown, but would extend between the broken or dash lines X and Y. Seven coils of the form illustrated in FIG. 1 are shown numbered 1 to 7. It may be seen that the coil ends $A'$ of the coils 1–7 pass beneath the coil assembly at one end of the rotor while the coil ends $B''$ pass beneath the coil assembly at the other end of the rotor. The coil ends $A''$ of the coils 1–7 pass over the coil assembly at one end of the rotor and the coil ends $B'$ pass over the coil assembly at the other end of the rotor. Liquid coolant, for example distilled water, is fed to the coil ends $A''$ and $B''$ and removed form coil ends $A'$ and $B'$.

An end view of a two pole rotor winding with end electrical connections between coils omitted, is shown in FIG. 3.

The parts of each coil portion linking adjacent coil sides of the coil portions are indicated generally at 8 and it may be seen from FIG. 1 and the top part of FIG. 3 that for each of the coils 1–7, the parts 8 make a gradual transition from one slot level to the other. This is not essential however and if desired the parts 8 can be cranked up to the required slot level adjacent the lower coil side as shown in the lower part of FIG. 3. Such an arrangement provides extra space beneath the coil assembly at the expense of space above the assembly.

Figure 4:
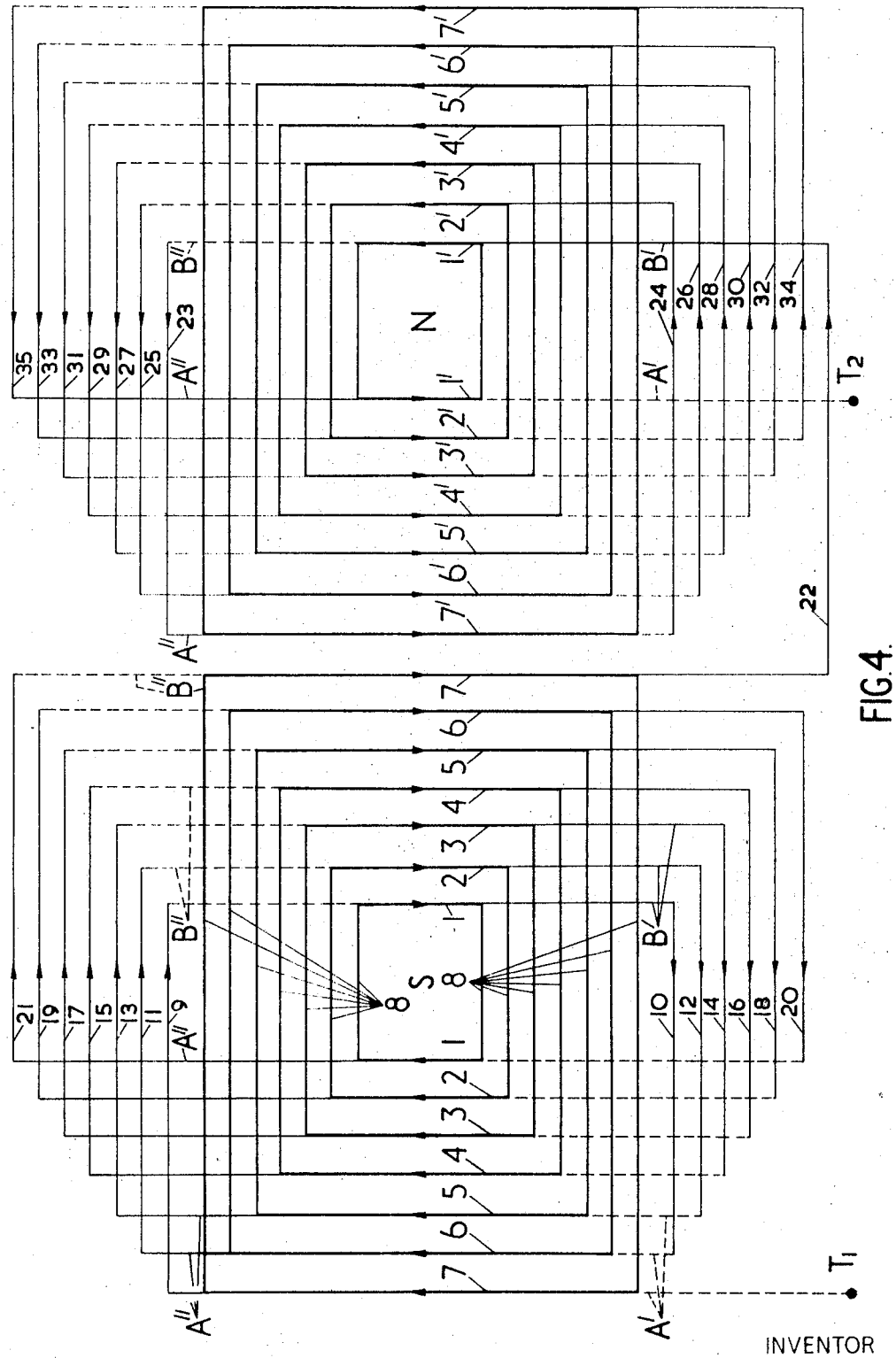
FIG. 4 shows diagrammatically the coils of a two pole rotor including one form of coil-to-coil electrical connections.

As with a conventional concentric coil winding, the coils associated with a pole face are connected in series and a convenient way of connecting the coils in series to provide a compact arrangement of the coil-to-coil electrical connections in shown in FIG. 4.

The coil end A' of coil 7 is connected to terminal $T_1$ of an excitation current source and the coil end A'' is connected via electrical connection 9 to coil end B'' of coil 1. Coil end B' of coil 1 is connected via electrical connection 10 to coil end A' of coil 6. The coil end A'' of coil 6 is connected via connection 11 to the coil end B'' of coil 2, the coil end B' of coil 2 via connection 12 to the coil end A' of coil 5 and so on through the remainder of the coils and electrical connections 13–20 until finally coil end A'' of coil 1 is connected via connection 21 to coil end B'' of coil 7. Coil end B' of coil 7 is then connected via connection 22 to coil end B' of the innermost coil 1' of the assembly of coils associated with the other pole face. Coil end B'' of coil 1' is connected via connection 23 to coil end A'' of outer coil 7' and so on through coils and connections 24–35 until coil end A' of coil 1' is connected to terminal $T_2$ of the excitation current source.

Figure 5:
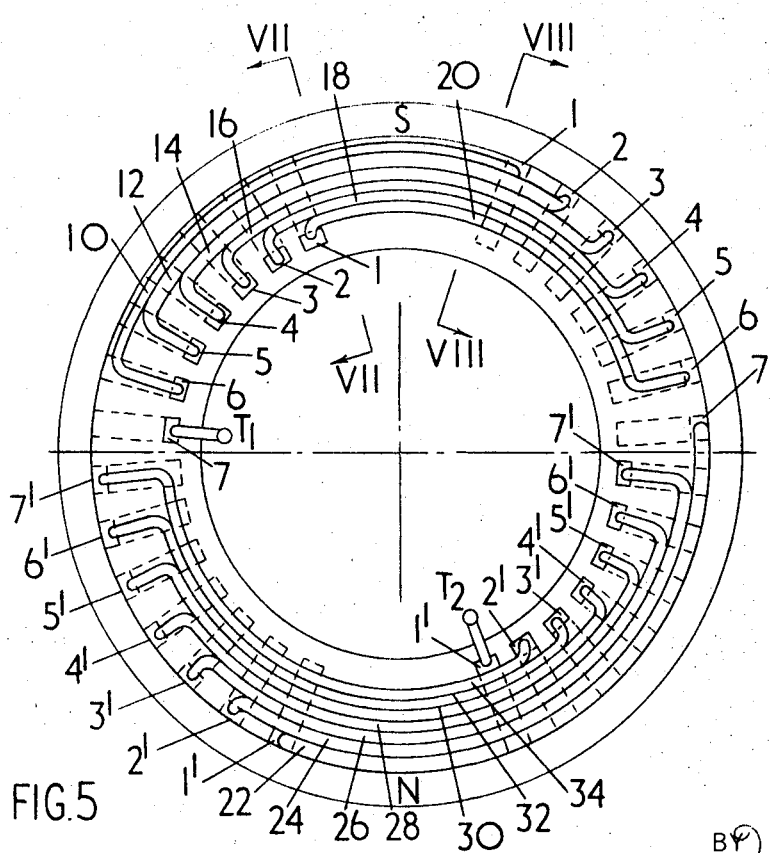
FIG. 5 is an end view of a two pole rotor with the 20 manifold omitted to show the electrical coil-to-coil connections.

An end view of the rotor showing a typical arrangement of the electrical connections is shown in FIG. 5.

Figure 6:
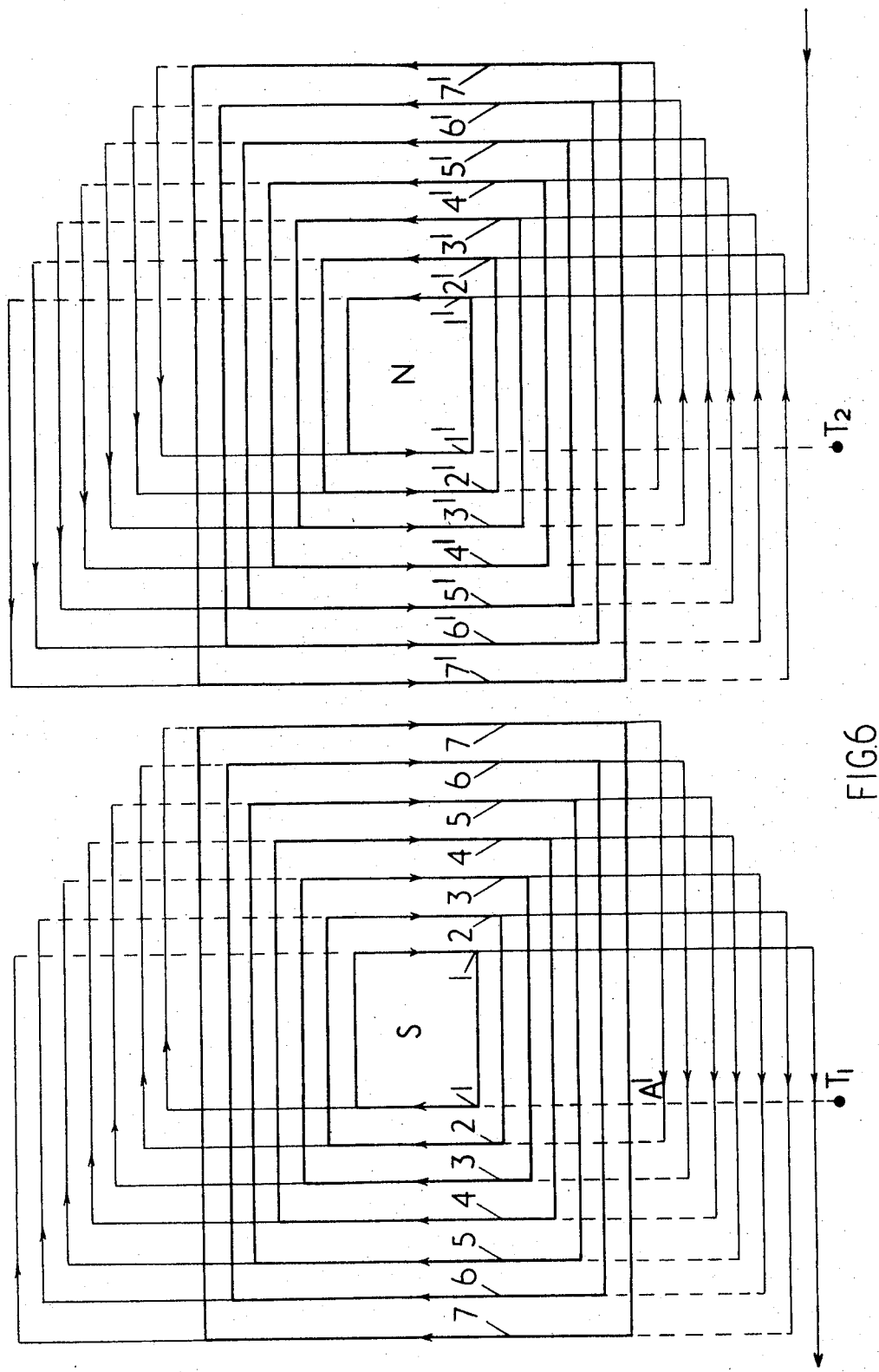
FIG. 6 shows diagrammatically an alternative arrangement of the coil-to-coil connections.

While in FIG. 4 the coil end A' of the outer coil 7 is connected to terminal $T_1$ which may be the positive terminal of a DC supply, other arrangements are possible. In FIG. 6 for example coil end A' of the inner coil 1 is connected to the terminal $T_1$.

Figure 7:
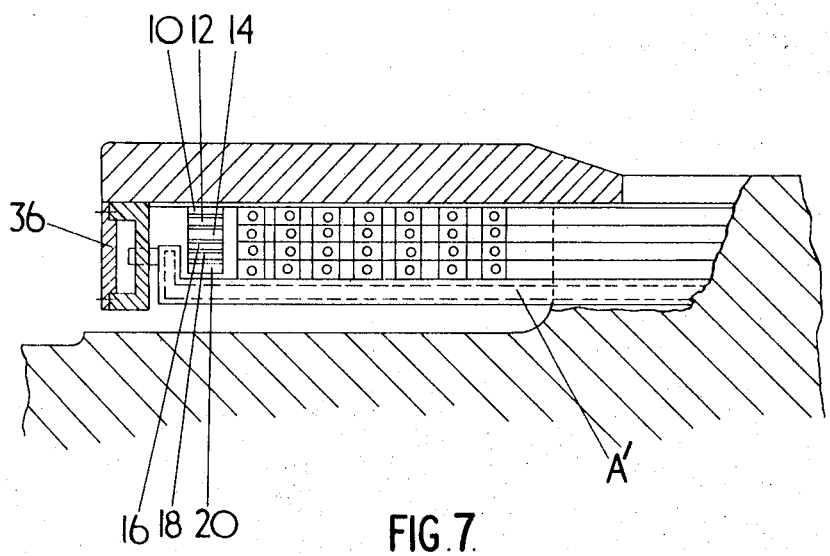
FIG. 7 is a section on line VII—VII of FIG. 5.
Figure 8:
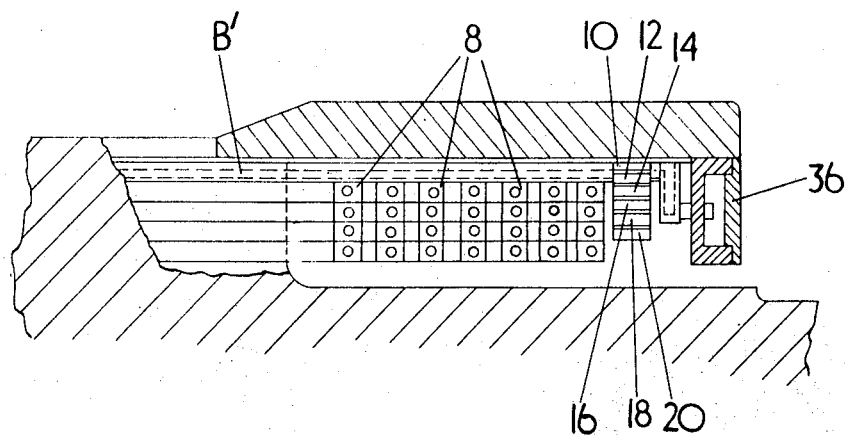
FIG. 8 is a section on line VIII—VIII of FIG. 5.
Figure 10:
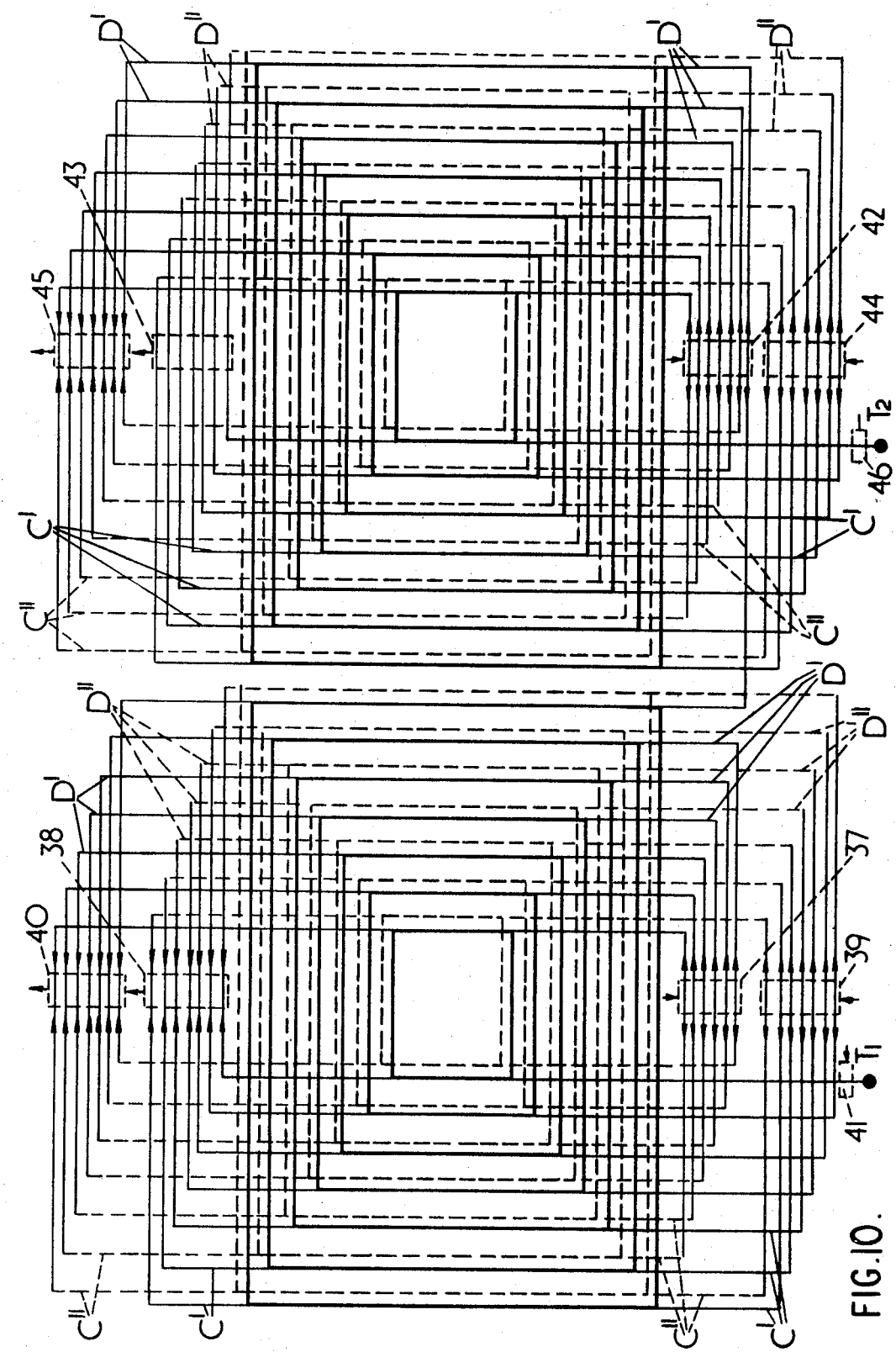

Referring to FIGS. 7 and 8, the coil ends A' and B' are connected to manifold 36 and the coil ends A'' and B'' are connected to a similar manifold at the other end of the rotor. Liquid coolant is supplied to and removed from the winding via the manifolds and, if desired, the electrical coil-to-coil connections 9–21 and 23–35 can be located within the manifolds so as to be cooled by liquid coolant therein.

Alternatively, the electrical coil-to-coil connections can be cooled by supplying liquid from manifold 36 to each individual connection at one end of the rotor and removing it from the connections at the other end of the rotor. The liquid coolant paths through the electrical connection in this example are connected with those in the coil sides.

The length of the passages for liquid coolant may be reduced by forming each turn with two conductors connected electrically in series but with the passages for liquid coolant connected in parallel. FIG. 9 shows a typical coil constructed in this manner. As in the case of the embodiment shown in FIG. 1, the coil is made up of two coil portions viz C and D interleaved with one another. The coil portion C is made up of two conductors C' and C'' connected electrically in series and the coil portion D by conductors D' and D'' which are also connected electrically in series. As in the case of FIG. 1, liquid coolant is fed to the conductor of each coil portion from an inlet at one end of the coil and removed from the conductors via an outlet at the opposite end of the coil. Details of the inlet and outlet for coolant and of the coil-to-coil electrical connections for a two pole rotor may be those shown in FIG. 13. FIG. 13 also shows the connection between conductors C', C'' and D', D'' of each coil portion and the inlet and outlet manifolds for liquid coolant are shown diagrammatically, with the inlets being shown at 37, 39, and 41, 42, 44 and 46 while the outlets are shown at 38, 40, 43, and 45.

The terminals for the supply of excitation current are shown at $T_1$ and $T_2$ as before.

Figure 12:
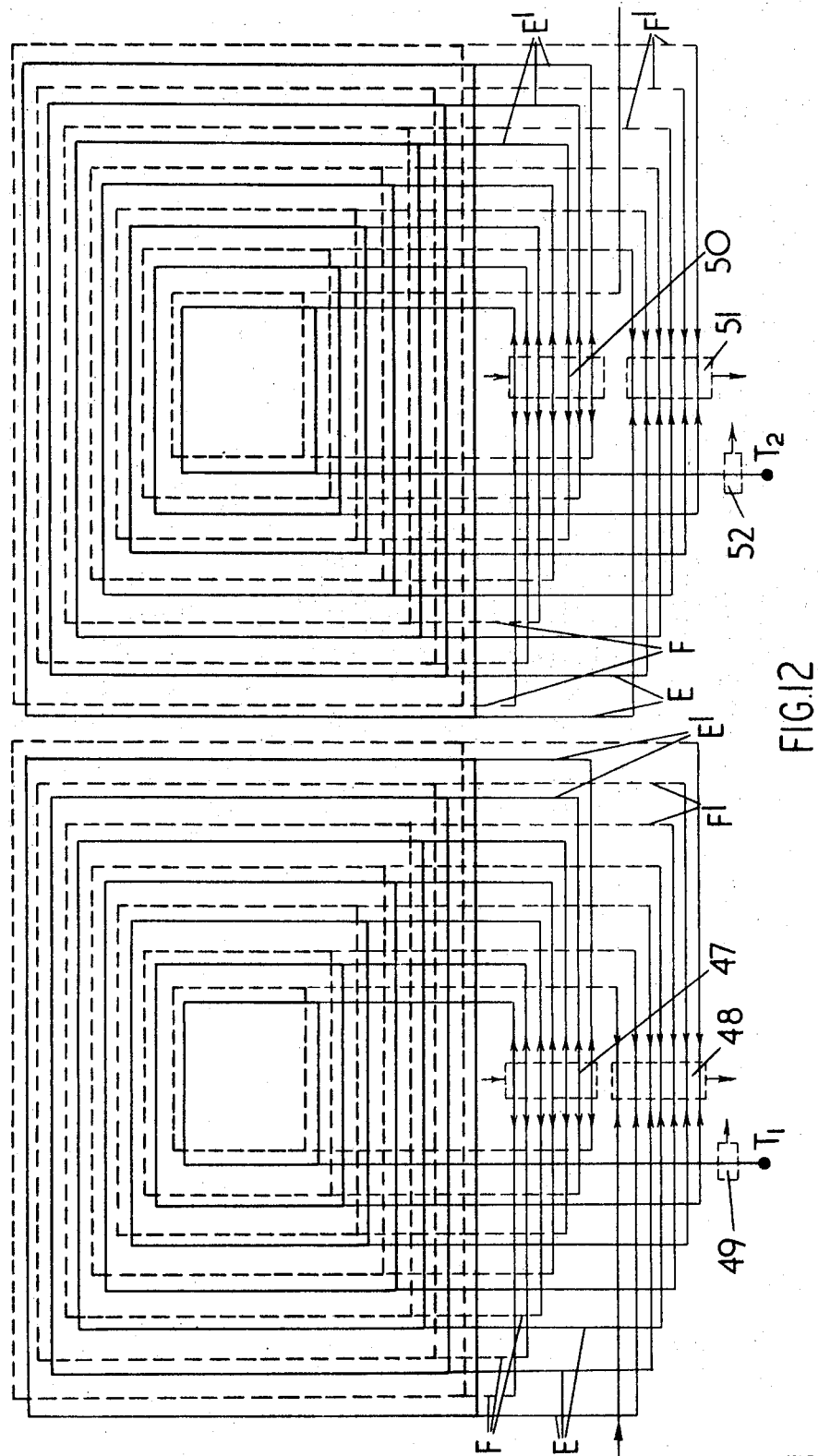

In another embodiment shown in FIGS. 11 and 12, the coils are interleaved so that the inlets and outlets are at the same end of the rotor. Each coil portion E and F is formed by a single conductor. In FIG. 12 the inlets and outlet for liquid coolant are shown diagrammatically with the inlets being shown at 47, 50 and the outlets at 48, 49, 51 and 52.

While the winding construction described is particularly suitable for liquid cooled rotor windings it can also be used with advantage where a gaseous coolant is used. It is particularly suitable for use with a high pressure gas coolant such as hydrogen at a pressure say in the range 500 to 3,000 lbs. per sq. inch absolute. At pressures of the order of 2,000 lbs. per sq. inch absolute, the hydrogen has heat transfer properties approaching those of water.

I claim:

1. A dynamo-electric machine cylindrical rotor having in its surface slots, conductors of an internally cooled rotor winding housed in the slots, the conductors being cooled by direct contact between a coolant and the conductor material, said winding having its conductors formed in coils, with successive turns of each coil occupying the same pair of slots symmetrically disposed one on each side of a pole face of the rotor, successive coils occupying successive pairs of slots on respective sides of said pole face, each coil being formed of at least two coil portions, each coil portion comprising helical turns which are so arranged and interleaved with one another that, for at least some of the turns of a coil portion, the coil side in one slot is displaced in a radial direction by at least one conductor thickness from the coil side in the other slot.

2. The rotor as claimed in claim 1, in which two coil portions are interleaved so that coil sides of one portion alternate with coil sides of the other portion in each of the slots occupied by the coil portions and the number of coil sides in each slot of a pair is chosen so that for each coil portion, the coil ends lie at opposite ends of the rotor, the coil ends at one end of the rotor being connected to an inlet for coolant and the coil ends at the other end of the rotor being connected to an outlet for coolant.

3. The rotor as claimed in claim 2, in which each coil portion comprises helical turns formed by a single conductor or by two or more conductors connected electrically in series but with the passages for coolant flowing in direct contact with the conductors being connected in parallel.

4. The rotor as claimed in claim 1, in which two coil portions are interleaved so that coil sides of one portion alternate with coil sides of the other portion in each of the slots occupied by the coil portions, and the number of coil sides in each slot of a pair is chosen so that for each coil portion, the coil ends lie at the same end of the rotor, one set of coil ends being connected to an inlet for coolant and the other set to an outlet for coolant.

5. The rotor as claimed in claim 1 which the coolant is water.

* * * * *